Patented June 24, 1930

1,766,748

UNITED STATES PATENT OFFICE

JOSEF HILGER, OF COLOGNE-MULHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

2-ARYL-4.6-DIHYDROXYPYRIMIDINES

No Drawing. Application filed March 28, 1929, Serial No. 350,837, and in Germany April 3, 1928.

The present invention relates to a process of preparing 2-aryl-4.6-dihydroxypyrimidines and to new compounds obtainable thereby, more particularly it relates to compounds of the general formula

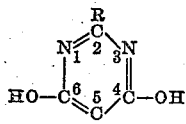

wherein R stands for an aromatic nucleus such as a naphthalene or benzene nucleus which aromatic nucleus may be substituted by any monovalent substituents, for example by halogen, alkyl-, nitro-, amino-, carboxylic acid- or sulfonic acid-groups.

According to the present invention 2-aryl-4.6-dihydroxypyrimidines of the above formula are obtainable by heating an amidine of an aryl-carboxylic acid of the general formula

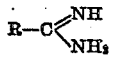

wherein R stands for an aromatic nucleus which may be substituted by any monovalent substituents with at least the molecular quantities of malonic acid diethyl ether to an elevated temperature, say to temperatures between 150° C. and 250° C. for about one hour. The process may be carried out in a highly boiling inert solvent such as nitrobenzene or advantageously malonic acid diethylester. The process proceeds according to the following equation. The pyrimidines separate in a crystalline form during the reaction and are filtered after cooling

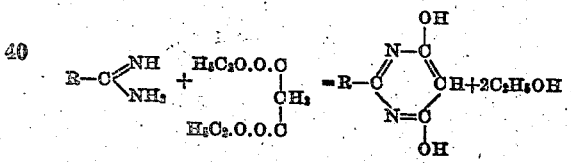

The new 2-aryl-4.6-dihydroxypyrimidines are generally yellowish crystalline substances, insoluble in alcohol, ether, acetone, mineral acids, soluble in caustic alkalies and in hot pyridine, they are valuable intermediate products in the manufacture of dyestuffs.

The invention is illustrated by the following examples but is not restricted thereto.

Example 1

15 parts by weight of 4-nitro-benzamidine, melting point 215° C., are finely powdered and are boiled for one hour while stirring with 300 parts by weight of malonic acid-diethylester. At first solution enters, then reddish-brown crystals precipitate which on further heating are transformed into the yellow colored pyrimidine of the formula:

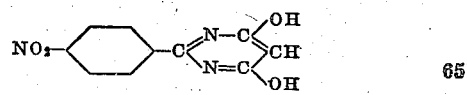

After cooling it is filtered with suction and the 2-(4'-nitrophenyl)-4.6-dioxypyrimidine is obtained from pyridine in form of yellowish matted little needles which melt while bulging out at 320° C.

The new derivative of pyrimidine is insoluble in alcohol, ether, acetone, mineral acids, it is soluble in soda lye and in hot pyridine.

The filtrate obtained by the working up is available again for a new condensation process.

The 2-(4'-nitrophenyl)-4.6-dichloropyrimidine is obtainable from the 2.(4'-nitrophenyl)-4-6 dihydroxypyrimidine by the interaction of phosphoroxychloride is after crystallizing from benzene in form of needles of melting point 266° C.

Instead of the 4-nitrobenzamidine there may also be used the 3-nitrobenzamidine with the same result.

Example 2

12 parts by weight of benzamidine are boiled while stirring for one hour with 50 parts by weight of malonic acid-diethylester. After cooling the 2-phenyl-4.6-dihydroxypyrimidine has been separated in a crystalline form; after recrystallization from glacial acetic acid, it has a melting point of 325° to 330° C. A second crystallization is found by distilling part of the unchanged malonicester; the yield of 2-phenyl-4.6-dihydroxypyrimidine amounts to about 100% of the theory. By using the 4- or 3-methylbenzamidine, halogenated benzamidine, naphthoic-acid amidine, etc., the corresponding pyrimidines are obtainable on the same way.

I claim:

1. The process which comprises heating an amidine of an aryl-carboxylic acid of the general formula

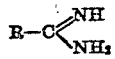

wherein R stands for an aromatic nucleus which may be substituted by any monovalent substituents with at least the molecular quantity of malonic acid diethylester to an elevated temperature for about one hour.

2. The process which comprises heating an amidine of an aryl-carboxylic acid of the general formula

wherein R stands for an aromatic nucleus which may be substituted by any monovalent substituents with at least the molecular quantity of malonic acid diethylester to a temperature of about 150° C. to about 250° C. for about one hour.

3. The process which comprises heating an amidine of an aryl-carboxylic acid of the general formula

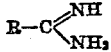

wherein R stands for an aromatic nucleus which may be substituted by any monovalent substituents with at least the molecular quantity of malonic acid diethylester in a highly boiling organic solvent for about one hour.

4. The process which comprises heating an amidine of an aryl-carboxylic acid of the general formula

wherein R stands for an aromatic nucleus which may be substituted by any monovalent substituents with at least the molecular quantity of malonic acid diethylester to a temperature of about 150° C. to about 250° C. for about one hour.

5. The process which comprises heating an amidine of an aryl-carboxylic acid of the general formula

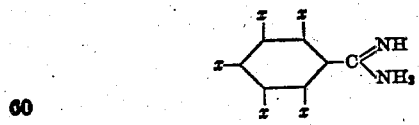

wherein $x$ stands for hydrogen or any monovalent substituents with at least the molecular quantity of malonic acid diethylester to an elevated temperature for about one hour.

6. The process which comprises heating an amidine of an aryl-carboxylic acid of the general formula

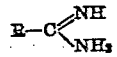

wherein R stands for an aromatic nucleus which may be substituted by any monovalent substituents with at least the molecular quantity of malonic acid diethylester to a temperature of about 150° C. to about 250° C. for about one hour.

7. The process which comprises heating an amidine of an aryl-carboxylic acid of the general formula

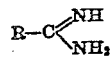

wherein R stands for an aromatic nucleus which may be substituted by any monovalent substituent with at least the molecular quantity of malonic acid diethylester in a highly boiling organic solvent for about one hour.

8. The process which comprises heating an amidine of an aryl-carboxylic acid of the general formula

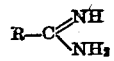

wherein R stands for an aromatic nucleus which may be substituted by any monovalent substituents with at least the molecular quantity of malonic acid diethylester to a temperature of about 150° C. to about 250° C. for about one hour.

9. The process which comprises heating a benzamidine of the general formula

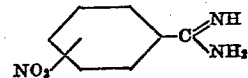

with malonic diethylester in excess to boiling for about one hour.

10. The process which comprises heating finely powdered 4-nitro-benzamidine in 300 parts by weight of malonic acid diethylester to boiling for about one hour while stirring.

11. As new products the compounds of the following general formula

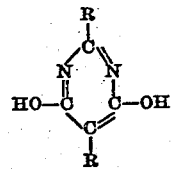

wherein R stands for an aromatic nucleus which is substituted by at least one monovalent substituent, being generally yellowish crystalline substances, insoluble in alcohol, ether, acetone, mineral acids, soluble in caustic alkalies and in hot pyridine, and being valuable intermediate products in the manufacture of dyestuffs.

12. As new products the compounds of the following general formula

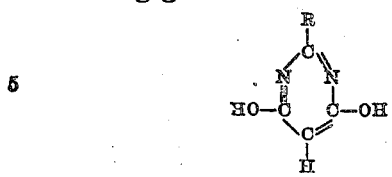

wherein R stands for a benzene nucleus which is substituted by at least one monovalent substituent being generally yellowish crystalline substances, insoluble in alcohol, ether, acetone, mineral acids, soluble in caustic alkalies and in hot pyridine, and being valuable intermediate products in the manufacture of dyestuffs.

13. As new products the compounds of the following general formula

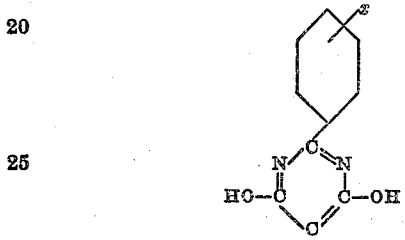

wherein $x$ stands for a monovalent substituent, being generally yellowish crystalline substances, insoluble in alcohol, ether, acetone, mineral acids, soluble in caustic alkalies and in hot pyridine, and being valuable intermediate products in the manufacture of dyestuffs.

14. As new products the compounds of the following general formula

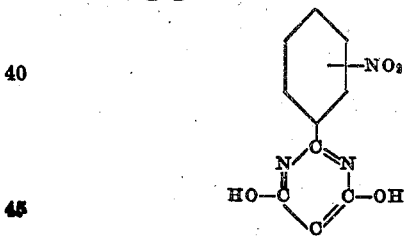

being generally yellowish crystalline substances, insoluble in alcohol, ether, acetone, mineral acids, soluble in caustic alkalies and in hot pyridine, and being valuable intermediate products in the manufacture of dyestuffs.

15. As a new product the compound of the formula

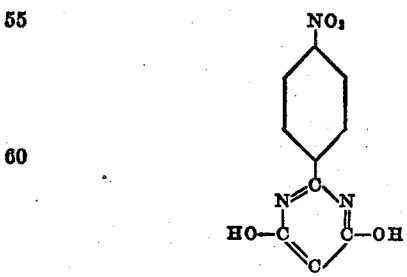

being a yellowish crystalline substance, melting at 320° C., being insoluble in alcohol, ether, acetone, mineral acids, soluble in soda lye and in hot pyridine, and being a valuable intermediate product in the manufacture of dyestuffs.

In testimony whereof I have hereunto set my hand.

JOSEF HILGER. [L. S.]

Certificate of Correction

Patent No. 1,766,748.  Granted June 24, 1930, to

JOSEF HILGER

It is hereby certified that error appears in the printed specification of the above numbered patent requiring correction as follows: Page 2, lines 115 to 120, claim 11, strike out the formula and insert instead

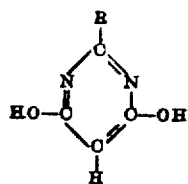

and that the said Letters Patent should be read with this correction therein that the same may conform to the record of the case in the Patent Office.

Signed and sealed this 19th day of August, A. D. 1930.

[SEAL.]

M. J. MOORE,
*Acting Commissioner of Patents.*